(12) United States Patent
Kanner

(10) Patent No.: US 6,248,194 B1
(45) Date of Patent: Jun. 19, 2001

(54) PROCESS OF MAKING FABRICATED TUBE CONSTRUCTION

(75) Inventor: Rowland W. Kanner, Guntersville, AL (US)

(73) Assignee: Atrion Medical Products, Inc., Arab, AL (US)

( * ) Notice: Subject to any disclaimer, the term of this patent is extended or adjusted under 35 U.S.C. 154(b) by 780 days.

(21) Appl. No.: 08/496,760

(22) Filed: Jun. 29, 1995

(51) Int. Cl.[7] .............................. B32B 31/04; B32B 31/20
(52) U.S. Cl. ...................... 156/69; 156/308.2; 156/309.6
(58) Field of Search .................. 156/69, 293, 308.2, 156/309.6, 275.1, 73.1, 73.5, 73.6; 264/443, 445

(56) References Cited

U.S. PATENT DOCUMENTS

| | | | |
|---|---|---|---|
| 3,948,704 | * | 4/1976 | Evans ...................................... 156/69 |
| 4,222,974 | * | 9/1980 | Smith ................................... 156/73.1 |
| 4,259,419 | * | 3/1981 | Uba ........................................ 156/69 |
| 4,606,470 | * | 8/1986 | Barlics .................................. 156/69 |
| 4,769,095 | * | 9/1988 | Sager ..................................... 156/69 |
| 5,160,061 | * | 11/1992 | Stolzman ............................. 156/73.6 |

* cited by examiner

Primary Examiner—Adrienne C. Johnstone
(74) Attorney, Agent, or Firm—Trexler, Bushnell, Giangiorgi, Blackstone & Marr, Ltd.

(57) ABSTRACT

A novel fabricated tube construction includes a sleeve formed from a stock material and a plastic neck member which includes a shoulder. The sleeve has overlapping edges which are joined together to form an lap seam. The neck member shoulder includes a mounting portion which has at least one raised, plastic weld rib thereon. An end portion of the sleeve initially overlays the shoulder such that the lap seam of the sleeve overlays the raised weld rib on the mounting portion. As a result, a small void is formed between the lap seam and the mounting portion. When the sleeve and the shoulder are joined together, the raised, plastic weld rib on the mounting portion melts and flows into the void to fill and seal the void. A portion of the mounting portion also melts to form a seal between the shoulder and the sleeve. When the shoulder and the sleeve are joined together in this manner, a leak-proof seal or joint is formed around the entire periphery of the shoulder between the shoulder and the sleeve.

5 Claims, 3 Drawing Sheets

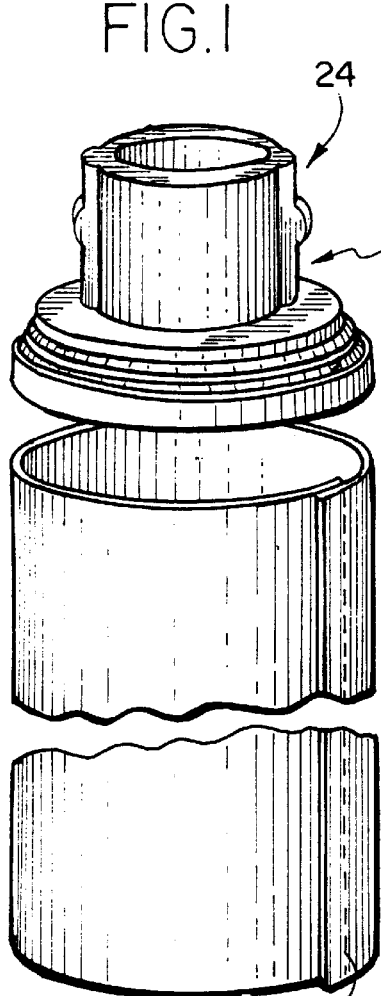
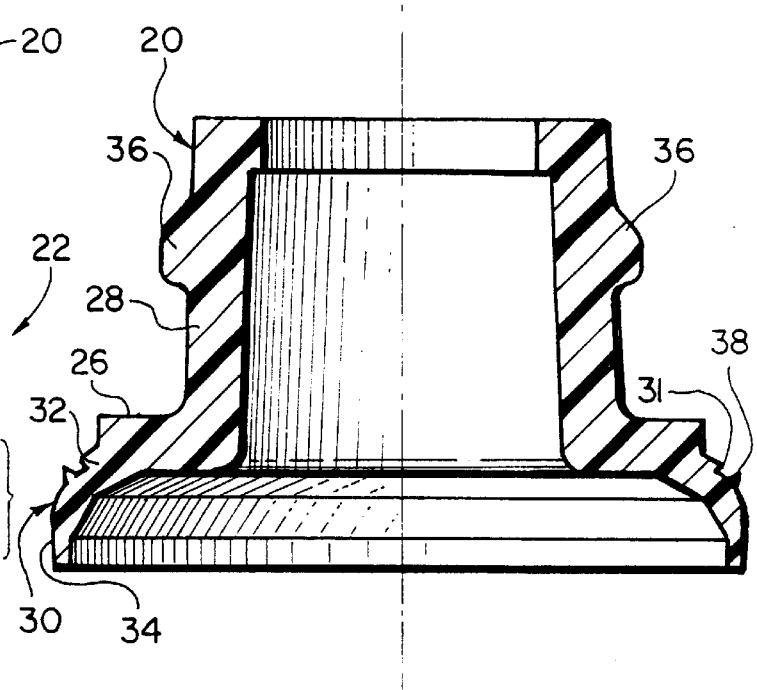
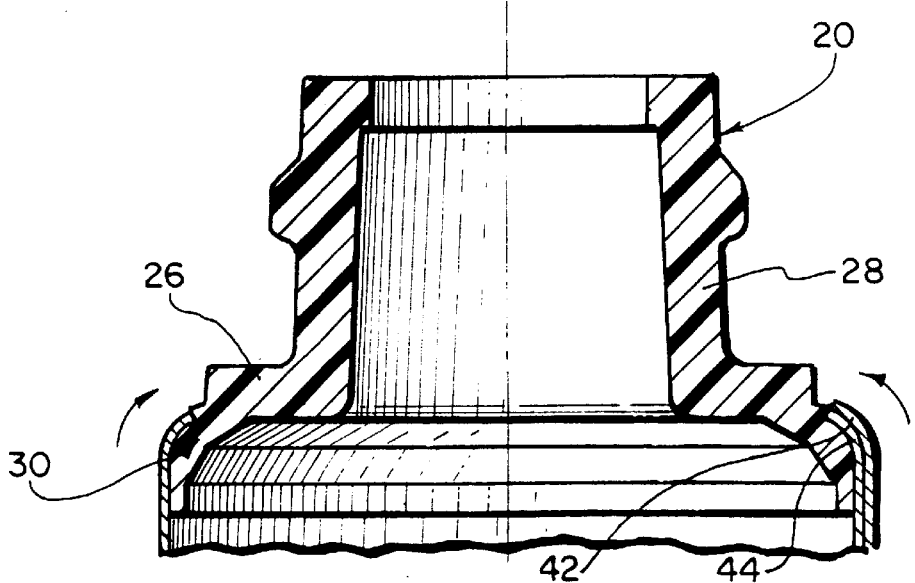

PROCESS OF MAKING FABRICATED TUBE CONSTRUCTION

BACKGROUND OF THE INVENTION

This invention is generally directed to a novel fabricated tube construction and a process for making the same. More particularly, the invention contemplates a tube construction having a novel shoulder that when joined to a sleeve eliminates the leakage problem which occurs with prior art tube constructions.

Fabricated tubes and processes of forming the same are known in the art. In prior art designs, the manufacture of the tube is essentially as described hereinafter. Initially, a sleeve or cylinder is formed out of a stock material by slightly overlapping the ends of the stock material to form a lap seam. A weld or heat seal is effected along the entire length of the overlapping lap seam. The stock material may be laminated and may have multiple layers and an inner foil lining. Next, the resulting cylinder from the stock are cut to a desired length to form individual sleeves. Thereafter, a neck member including a shoulder, to which the sleeve is to be affixed, is positioned on a mandrel. The sleeve is slid over the mandrel until an end portion of the sleeve is brought up into proximity with a mounting portion of the neck shoulder. Subsequently, with the neck shoulder and sleeve on the mandrel, hot air is applied to the mounting portion of the shoulder and the end portion of the sleeve to soften both components. Next, a die, which includes a radio frequency welder, is brought into engagement about the mounting portion of the shoulder for 360° and through the use of radio frequencies, welds the end portion of the sleeve to the mounting portion of the shoulder thereby producing a slight reforming of the end portion of the sleeve so that it conforms to the radius portion of the shoulder. A cap is then put onto the shoulder and the open end of the sleeve is used to fill the tube. After the sleeve is filled with the desired contents, the open end of the sleeve is sealed to complete the process.

With this prior art design, there is a problem of leakage at the point of the overlapping lap seam of the sleeve at the location of welding to the neck shoulder. Leaks most often occur at the void created at the place where the longitudinal lap seam inner layer spaces the overlapping outer layer away from the shoulder because of the inner layer's thickness. It can be appreciated that at this point, a double layer exists and the area at which the outer portion of the sleeve overlaps the inner portion of the sleeve would not always attain a proper, desired seal. Leakage is particularly prominent with three layer laminates having center layers of aluminum or high temperature film stocks.

In prior art tube constructions, the neck member shoulder surface to which the sleeves are heat sealed are smooth and continuous. The heat sealing technique therefore requires that a great deal of heat from a heat die be conducted through the sleeve into the shoulder to fuse both the shoulder and the sleeve together. Often, process parameters and cosmetic issues dictated less than optimum temperature or duration resulting in failure to close the void created by the seam, and thus, leakage results.

The present invention provides a novel tube construction and a process of making the same which eliminates the leakage problem found in prior art tube constructions. Other features and advantages of the invention will become apparent upon reading the following detailed description and upon reference to the drawings.

OBJECTS AND SUMMARY OF THE INVENTION

An object of the present invention is to provide a novel fabricated tube construction and a process for making the same which eliminates leakage problems found in prior art tube constructions due to the tube body overlapping layers.

Another object of the present invention is to provide a fabricated tube construction having a novel neck member shoulder structure that when joined to a seamed sleeve eliminates the leakage problem which occurs with prior art tube constructions.

Yet another object of the present invention is to provide a novel fabricated tube construction which can be easily and cost effectively manufactured.

Briefly, and in accordance with the foregoing, the present invention discloses a novel fabricated tube construction which includes a sleeve formed from flat stock material, which may be laminated, and a novel, plastic neck member and shoulder construction. The sleeve has overlapping edges which are joined together to form a lapped seam. The neck shoulder includes a mounting portion upon which at least one raised, plastic rib is provided. Preferably, a plurality of weld ribs are provided on the mounting portion of the shoulder. Each weld rib extends around the entire periphery of the mounting portion, but may extend only around a portion of the mounting portion. An end portion of the sleeve initially overlays the shoulder such that the lap seam overlays the raised weld rib on the mounting portion. As discussed above, a small, but significant, void results between the lap seam on the sleeve and the mounting portion of the shoulder due to the thickness of the inner layer of the stock material. When the sleeve and the shoulder are joined together, the raised, plastic weld rib melts and flows into the void to fill and seal the void. In addition, a portion of the shoulder melts to form a seal between the shoulder and the sleeve. This results in a leak-proof seal or joint between the sleeve and the shoulder of the neck member.

A process for forming the fabricated tube construction is also disclosed herein. First, flat stock material, which may be laminated, is provided for the sleeve and a neck member with a shoulder having a mounting portion upon which at least one raised, plastic weld rib is provided. The ends of the stock material are overlapped to form a tube, and are welded, heat sealed or otherwise suitably joined together to form a tubular component with a lap seam. The lapped stock material is then cut to length to provide a tubular body or sleeve. Next, an end portion of the tubular body or sleeve is brought into contact with the mounting portion of the shoulder. This step may be effected by placing the neck member on a mandrel or the like and sliding the sleeve over the mandrel until an end portion of the sleeve overlaps the mounting portion of the shoulder. As discussed above, the lap seam forms a small void between the sleeve and the shoulder due to the thickness of the inner layer of the stock material. Thereafter; the shoulder and the sleeve are joined together by a thermal and/or high frequency welding procedure. During this step, the plastic weld rib on the mounting portion melts and flows into the void between the sleeve and the shoulder to seal the void and provide a complete leak-proof joint. A portion of the shoulder will also melt to seal the sleeve and the shoulder together. This step may be effected by directing hot air onto the mounting portion of the shoulder and the end portion of the sleeve to soften the end portion and the mounting portion, and, thereafter, bringing a die into engagement about the mounting portion of the shoulder which welds the end portion of the sleeve and the shoulder together to produce a slight reformation of the end portion of the sleeve so that the sleeve conforms to the mounting portion of the shoulder. The welding operation may be attained by use of frequency welding, ultrasonic welding, heat sealing or some other similar form of thermal welding.

BRIEF DESCRIPTION OF THE DRAWINGS

The organization and manner of the structure and operation of the invention, together with further objects and advantages thereof, may best be understood by reference to the following description, taken in connection with the accompanying drawings, wherein like reference numerals identify like elements in which:

FIG. 1 is a partial, exploded perspective view of a tube construction which incorporates the features of the invention and which includes a neck member having a shoulder and a sleeve;

FIG. 2 is an enlarged cross-sectional view of the neck member shoulder without the sleeve joined therewith;

FIG. 5 is an enlarged cross-sectional view of the neck member shoulder with the sleeve joined therewith;

DETAILED DESCRIPTION OF THE PREFERRED EMBODIMENT

Figure 3:
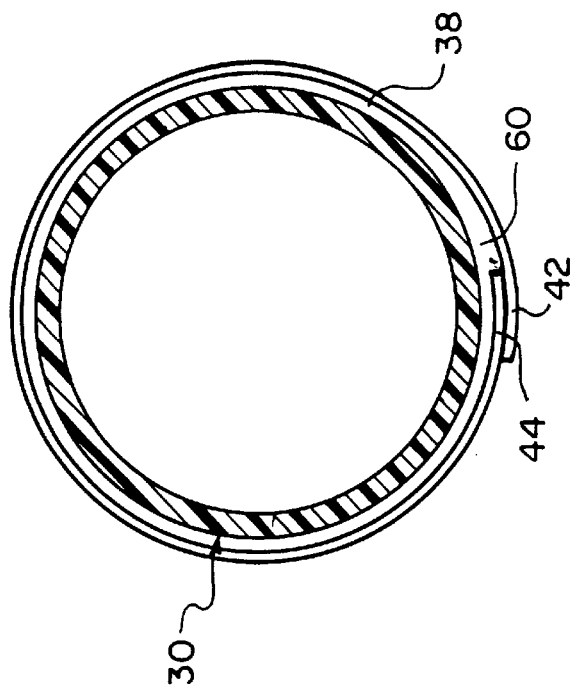
FIG. 3 is a cross-sectional view of the sleeve encircling the neck member shoulder prior to the joining of the sleeve and the shoulder together.
Figure 4:
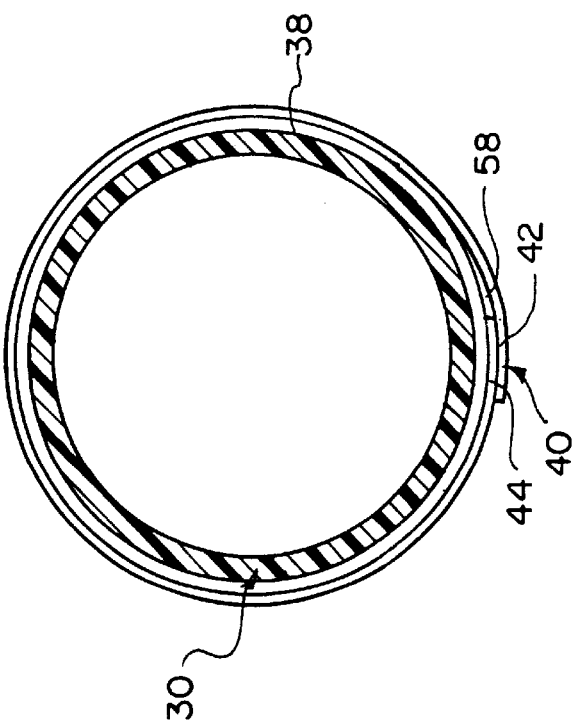
FIG. 4 is a cross-sectional view of the sleeve and the neck member shoulder after the sleeve and the shoulder have been joined together and with any prior voids filled.

While the invention may be susceptible to embodiment in different forms, there is shown in the drawings, and herein will be described in detail, a specific embodiment with the understanding that the present disclosure is to be considered an exemplification of the principles of the invention, and is not intended to limit the invention to that as illustrated and described herein.

Directing attention to FIG. 1, a novel neck or shoulder member 20 and a sleeve 22 are shown, which, when joined together, as described herein, form a fabricated tube construction 24 which incorporates the features of the present invention and prevents the leakage problem inherent in prior art tube constructions. The neck or shoulder member 20 is formed of a suitable, plastic material, preferably MDPE (NA-285) resin. The sleeve 22 is formed from a stock material, preferably Allusuisse webstock, and may be formed from a laminated material.

The plastic neck or shoulder member 20 has a generally annular base portion 26 and a wall 28, which may be generally cylindrical in shape, which extends in a first direction therefrom. The ends of the wall 28 are open such that a passageway is provided through the wall 28. The wall 28 has a pair of ears 36 thereon for attaching a cap (not shown) to the wall 28 to close the open end of the shoulder member 20. An orifice (not shown) is provided through the base portion 26 and is aligned with the passageway through the wall 28.

A radiused mounting portion 30 depends from the base portion 26 in a direction opposite to that which the wall 28 extends and, in effect, provides a mounting shoulder for the sleeve 22. A protruding stop 31 extends outwardly from the mounting portion 30 at generally the juncture between the mounting portion 30 and the base portion 26 for reasons described herein. The mounting portion 30 is annular and includes a generally curved portion 32 which extends from the base portion 26 outwardly to a flat portion 34, which, as shown, is generally perpendicular to the base portion 26.

At least one raised, plastic bead or weld rib 38 is provided on the curved portion 32 of the mounting portion 30 which extends around the entire periphery of the curved portion 32. Preferably, a plurality of plastic ribs are provided around the mounting portion 30 of the shoulder member 20, but only one such weld rib or bead 38 has been shown for clarity of description and illustration.

The sleeve 22 is a tube-like member which has overlapping ends that are joined together by suitable means, such as welding, heat sealing or otherwise being affixed together, to form a lap seam 40. Specifically, the edges of the flat stock material are overlapped and a weld, heat seal or the like is effected along the length of the stock material to form the lap seam 40. It can be appreciated that at the lap seam 40, a double layer of stock material, formed from an outer layer 42 and an inner layer 44, exists.

Figure 6:
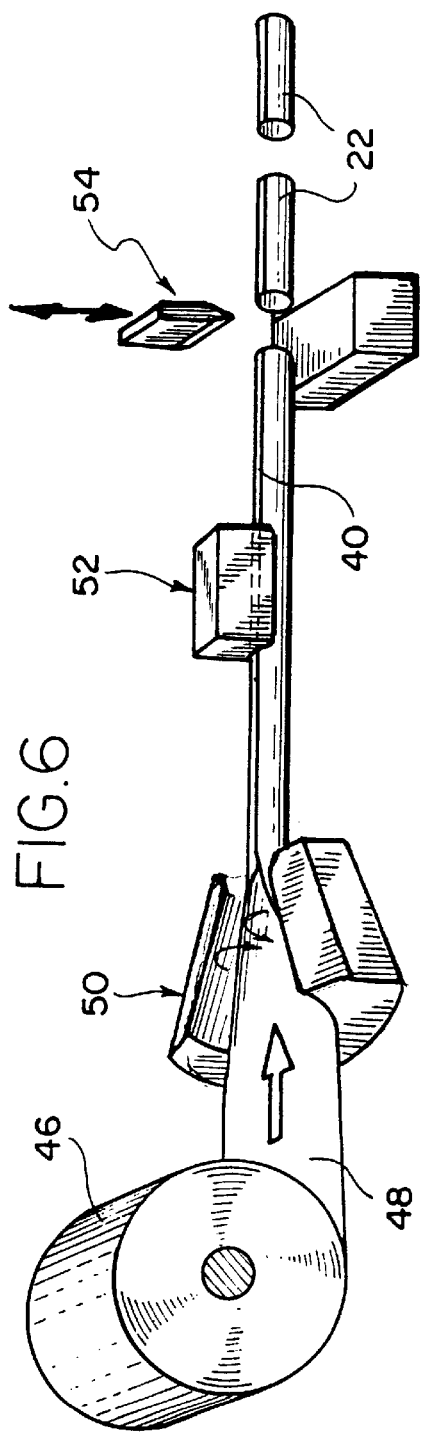
FIG. 6 is a schematic view of the steps in a process for forming the sleeve used in the present invention.
Figure 7:
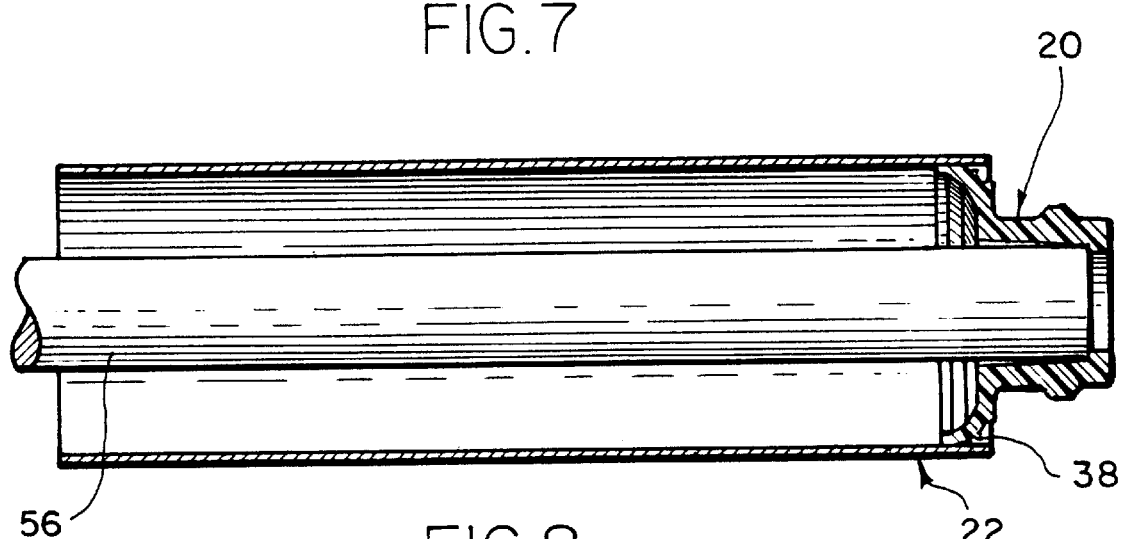
FIG. 7 is a schematic view of a first step in a process for joining the sleeve and the neck member shoulder together which includes engaging the neck member shoulder with one end of a mandrel and sliding the sleeve over the mandrel until the sleeve overlaps a mounting portion of the shoulder.

To produce the tube 24 of the present invention, first, the sleeve 22 is formed as shown schematically in FIG. 6. Initially, a flat roll 46 of stock material 48 is provided. The edges of the stock material 48 are rolled over by a suitable apparatus 50 so that a tube is formed. At this point, the edges of the stock material 48 overlap such that the outer layer 42 overlaps the inner layer 44. Thereafter, the lap seam 40 is formed by effecting a weld along the overlapping edges, a heat seal or otherwise affixing the edges together, along the length of the tube by a suitable apparatus 52. The sealed elongate tube is then cut into separate sleeves 22 by a suitable cutting apparatus 54. The sleeve 22 is now ready to be joined with the shoulder member 20.

To join the shoulder member 20 and the sleeve 22 together, the neck or shoulder member 20 is engaged on one end of a conventional mandrel 56 or the like. The sleeve 22 is slid over the mandrel 56 until an end portion of the sleeve 22 overlaps the mounting portion 30 of the shoulder member 20. To ensure that the sleeve 22 properly overlaps the mounting portion 30, the end portion of the sleeve 22 should overlap the mounting portion 30 to the point where the stop 31 protrudes outwardly from the juncture between the mounting portion 30 and the wall 28.

When the end portion of the sleeve 22 overlays the mounting portion 30, the lap seam 40 on the sleeve 22 overlays the plastic raised weld rib 38 on the mounting portion 30. As shown in FIG. 3, a small void 58 is formed between the lap seam 40 and the mounting portion 30 of the shoulder member 20 between the mounting portion 30 and the outer layer 42 of the sleeve 22 due to the thickness of the inner layer 44 of the stock material.

Thereafter, the sleeve 22 and the neck or shoulder member 20 are joined together by suitable means. When the sleeve 22 and the shoulder member 20 are joined together, the raised, plastic weld rib 38 functions like an energy director at the lap seam 40 and the weld rib 38 is sacrificed and melts and flows into the void 58 to fill and seal the void 58 with plastic material 60. In addition, a portion of the shoulder member 20 provides material which melts to provide a better joint or seal between the end portion of the sleeve 22 and the mounting portion 30 of the shoulder 20. Thus, the sleeve 22 and the shoulder member 20 are securely sealed together around the entire periphery of the mounting portion 30 to form a leak-proof seal or joint.

Figure 8:
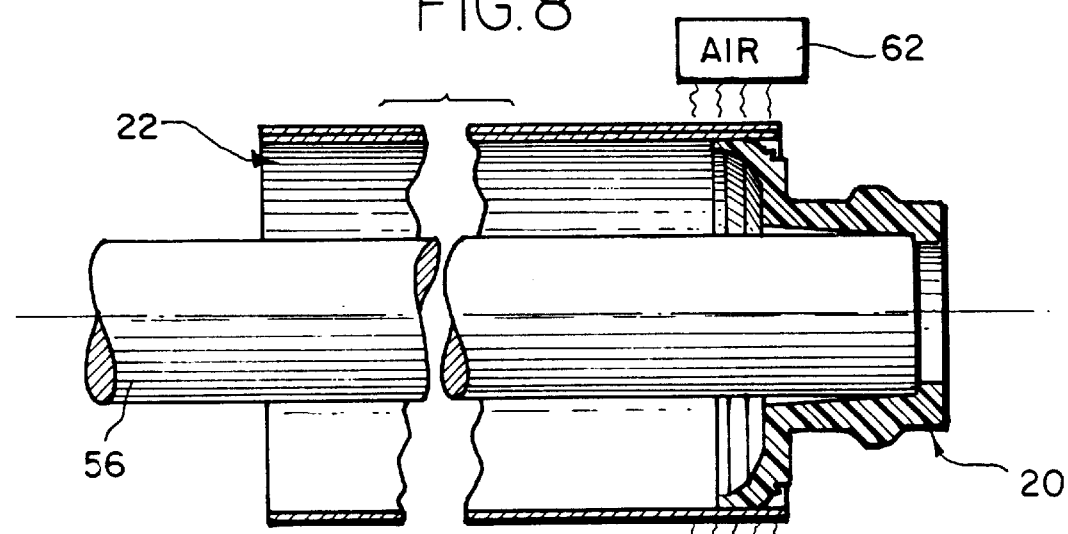
FIG. 8 is a schematic view of a second step in a process for joining the sleeve and the shoulder together which includes directing hot air onto an end portion of the sleeve and to the mounting portion of the shoulder.
Figure 9:
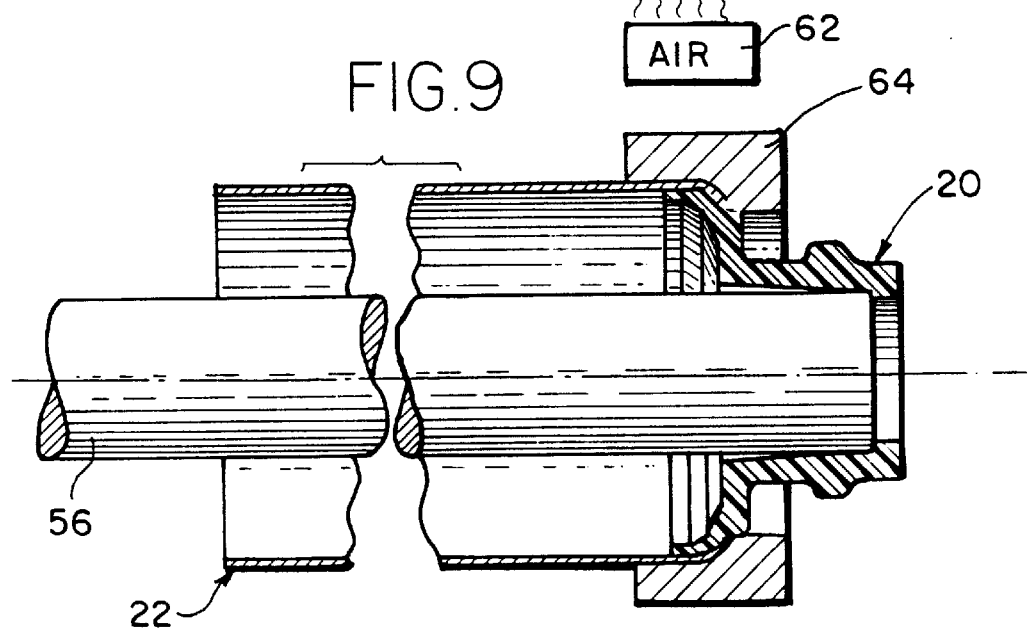
FIG. 9 is a schematic view of a third step in a process for joining the sleeve and the shoulder together which includes bringing a die into engagement with the end portion of the sleeve and the mounting portion of the neck shoulder to weld the sleeve and neck shoulder together.

This joining step may be effected, as shown in FIG. 8, by first preheating the mounting portion 30 of the shoulder member 20 at the area where the weld rib 38 is provided and the end portion of the sleeve 22 by blowing or directing hot air thereon around the entire periphery of the end of the sleeve 22 and the shoulder member 20 by a suitable hot air blower 62 to soften the weld rib 38, the mounting portion 30 and the end portion of the sleeve 22, and thereafter, as shown in FIG. 9, bringing a heated die 64 into engagement about the mounting portion 30 of the shoulder member 20 and around the end portion of the sleeve 22 which thermally welds the end portion of the sleeve 22 and the shoulder member 20 together. This will produce a slight reforming of the end portion of the sleeve 22 so that the sleeve 22 conforms to the mounting portion 30 of the shoulder member 20.

Alternatively, instead of directing hot air around the entire periphery of the end of the sleeve 22 and the shoulder member 20 by the hot air blower as shown in FIG. 8, the sleeve 22 and shoulder member 20 could be rotated so that hot air is directed around the entire periphery of the end of the sleeve 22 and the shoulder member 20. It should be noted that the step as shown in FIG. 8, namely, the preliminary heating of the material prior to thermal welding, is optional. It is believed that preheating provides a better weld. Further, the application of heat by die 64 is illustrated schematically and may take various forms. The die 64 may be electrically heated, or a frequency or an ultrasonic weld procedure may be effected in conjunction with the application of reforming pressure by die 64. In addition, the sleeve 22 and the mounting portion 30 may be heat sealed together or by some other similar form of thermal welding.

The weld rib or ribs 38 melts and is, in effect, "sacrificed" so that the material of the weld rib 38 flows into the lap seam 40 of the sleeve 22 to insure proper sealing between the shoulder member 20 and the end portion of the sleeve 22. In actuality, a weld rib or ribs 38 is only needed in the area of the lap seam 40, but for simplicity in the manufacture of the shoulder member 20 and for joining the shoulder member 20 and the sleeve 22 together, the weld rib or ribs 38 is formed about the entire periphery of the mounting portion 30 so that wherever the lap seam 40 is positioned relative to the circumference of the mounting portion 30 prior to joining the sleeve 22 and shoulder member 20 together, the lap seam 40 will overlap the weld rib or ribs 38.

It is to be noted that the above-described process is the preferred process for joining the sleeve 22 and the shoulder member 20 together, but the process for joining such components together is not limited to the process described herein. It is envisioned that one of ordinary skill in the art could devise other methods for joining the novel shoulder member 20 and sleeve 22 together.

In addition, it is to be noted that the sleeve 22 may be formed by other methods than that described herein. For example, the sleeve could be extruded into its tubular form and cut to form the individual sleeves. When the sleeve and the neck shoulder are joined together, the weld rib is sacrificed and flows into any irregularities, such as folds or creases, in the sleeve to fill such irregularities which could prevent proper sealing between the sleeve and neck shoulder. A portion of the mounting portion of the shoulder provides material which melts to provide a better joint or seal between the end portion of the sleeve and the mounting portion of the shoulder. Thus, the extruded sleeve and the shoulder member are securely sealed together around the entire periphery of the mounting portion to form a leak-proof seal or joint.

While a preferred embodiment of the present invention is shown and described, it is envisioned that those skilled in the art may devise various modifications of the present invention without departing from the spirit and scope of the appended claims.

The invention claimed is:

1. A process for forming a tube construction comprising the steps of: providing a stock material; overlapping edges of said stock material to form a sleeve member; joining said overlapping edges of said stock material together to form a seam; providing a shoulder member having a mounting portion which has at least one raised, plastic rib thereon; bringing an end portion of said sleeve member in contact with the mounting portion of said shoulder member, said seam forming a void between said sleeve member and said shoulder member; and joining said shoulder member and said sleeve member together, and melting said plastic rib to cause said plastic rib to flow into said void between said sleeve member and said shoulder member to fill said void and seal said sleeve member and said shoulder member together.

2. A process as defined in claim 1, wherein said step of bringing said end portion of said sleeve member in contact with the mounting portion of said shoulder member comprises placing said shoulder member on a mandrel or the like and sliding said sleeve member over said mandrel until said end portion of said sleeve member is in contact with the mounting portion of said shoulder member.

3. A process as defined in claim 2, wherein said step of joining the sleeve member to the shoulder member includes a thermal welding of said members.

4. A process as defined in claim 2, wherein said step of joining said shoulder member and said sleeve member together comprises directing hot air onto said mounting portion of said shoulder member to soften said plastic rib.

5. A process as defined in claim 4, wherein said step of joining said shoulder member and said sleeve member together further comprises bringing a die into engagement about said mounting portion of said shoulder member, said die welding said end portion of said sleeve member and said shoulder member together to produce a slight reforming of said end portion of said sleeve member so that said sleeve member conforms to said mounting portion of said shoulder member.

* * * * *